(12) United States Patent
Soskind

(10) Patent No.: US 6,735,362 B1
(45) Date of Patent: May 11, 2004

(54) DISPERSIVE OPTICAL SYSTEMS UTILIZING TRANSMISSIVE DIFFRACTION GRATINGS

(75) Inventor: Yakov G. Soskind, Plainsboro, NJ (US)

(73) Assignee: KSM Associates, Inc., Cincinnati, OH (US)

( * ) Notice: Subject to any disclaimer, the term of this patent is extended or adjusted under 35 U.S.C. 154(b) by 0 days.

(21) Appl. No.: 09/914,195

(22) PCT Filed: Feb. 24, 2000

(86) PCT No.: PCT/US00/05087
§ 371 (c)(1),
(2), (4) Date: Aug. 23, 2001

(87) PCT Pub. No.: WO00/50945

PCT Pub. Date: Aug. 31, 2000

Related U.S. Application Data (60) Provisional application No. 60/121,365, filed on Feb. 25, 1999.

(51) Int. Cl.⁷ .................................. G02B 6/34
(52) U.S. Cl. ..................... 385/37; 385/24; 385/36; 359/566; 398/84
(58) Field of Search ............... 385/37, 24, 35, 385/36; 359/130, 161, 566, 569, 571

(56) References Cited

U.S. PATENT DOCUMENTS

| | | | | |
|---|---|---|---|---|
| 5,026,131 A | * | 6/1991 | Jannson et al. ............. | 359/130 |
| 5,107,359 A | * | 4/1992 | Ohuchida .................... | 359/124 |
| 5,457,573 A | * | 10/1995 | Iida et al. .................... | 359/127 |

* cited by examiner

*Primary Examiner*—Drew Dunn
*Assistant Examiner*—Fayez Assaf
(74) *Attorney, Agent, or Firm*—Maurice M. Klee (57) ABSTRACT

The linear dispersion of a dispersive optical system is increased by: (a) employing a transmissive diffraction grating (6) as a dispersive element; and (b) passing light through the grating twice. A reflector (7) is used to achieve the double passage through the grating. The system can be used to disperse light into its composite wavelengths (e g., the system can be a wavelength demultiplexer) or to combine dispersed light at different wavelengths into composite light (e.g., the system can be a wavelength multiplexer). The system can be employed in wavelength division multiplexed (WDM) optical communication systems.

2 Claims, 6 Drawing Sheets

DISPERSIVE OPTICAL SYSTEMS UTILIZING TRANSMISSIVE DIFFRACTION GRATINGS

CROSS REFERENCE TO RELATED APPLICATIONS

This application is the U.S. national phase under 35 USC §371 of International Application No. PCT/US00/05087, filed Feb. 24, 2000, which was published in English under PCT Article 21(2) on Aug. 31, 2000 as International Publication No. WO 00/50945. This application claims the benefit under 35 USC §119(e) of U.S. Provisional Application No. 60/121,365 filed Feb. 25, 1999, the contents of which in its entirety is hereby incorporated by reference.

The present invention relates to dispersive optical systems employing transmissive diffractive gratings, and particularly to optical systems with increased dispersion achieved by passing the light twice through the transmissive diffraction grating.

BACKGROUND OF THE INVENTION

Dispersive systems that utilize diffractive gratings (DG) are used in several fields, including spectroscopic and communication systems. One of the most important characteristics of such systems is their linear dispersion, i.e., the linear separation between different wavelengths in the system's image plane. The linear dispersion plays the key role in defining the resolution of the spectral apparatus, or the capacity of the communication system.

The linear dispersion is proportional to the angular dispersion of the DG and the focal length of the optics that transform the angular dispersion into the linear dispersion. An increase in linear dispersion of a system by a proportional increase in the focal length of the optics will unavoidably lead to a proportional increase in the size and cost of the optical elements and the system as a whole. An alternative approach to increase the linear dispersion of the system is to increase the angular dispersion of the dispersion component used in the system. The angular dispersion of a grating is inversely proportional to the spacing between the grating's grooves, so that reducing the spacing leads to an increase in the angular dispersion of the grating and in the linear dispersion of the entire system. Unfortunately, a reduction of the spacing between the grating grooves has limitations based on fabrication tolerances and manufacturability.

Thus it would be desirable to provide a dispersive optical system with an increased linear dispersion without increasing the focal length of the optics or decreasing the spacing of the grating structure.

From a manufacturing perspective, it is advantageous to fabricate a grating on a flat surface rather than a curved one. Transmissive diffractive gratings on flat substrates can be made economically by standard lithographic techniques.

SUMMARY OF THE INVENTION

It is an object of the present invention to provide a dispersive system based on a transmissive diffractive grating with increased linear dispersion without increasing the grating line frequency and preferably without increasing the system's dimensions and without sacrificing the image quality of the output spectrum.

The increase in linear dispersion is achieved by passing the light twice through the grating. The system is designed such that on each pass through the grating the dispersion of the system is increased. Preferably, the linear dispersion of the system is increased approximately twice compared to that of a system with a single transmissive diffraction grating with the same line frequency. Further, this increase in the linear dispersion of the system is preferably achieved without increasing the dimensions of the optical components or the size of the entire system.

Simply passing the light twice through a transmissive DG does not assure an overall increase in a system's dispersion. Rather, the optics of the system must be chosen so that the dispersive effects of the two passages are additive. In addition, it is also necessary to meet the system specifications for image quality of the output spectrum.

Figure 1:
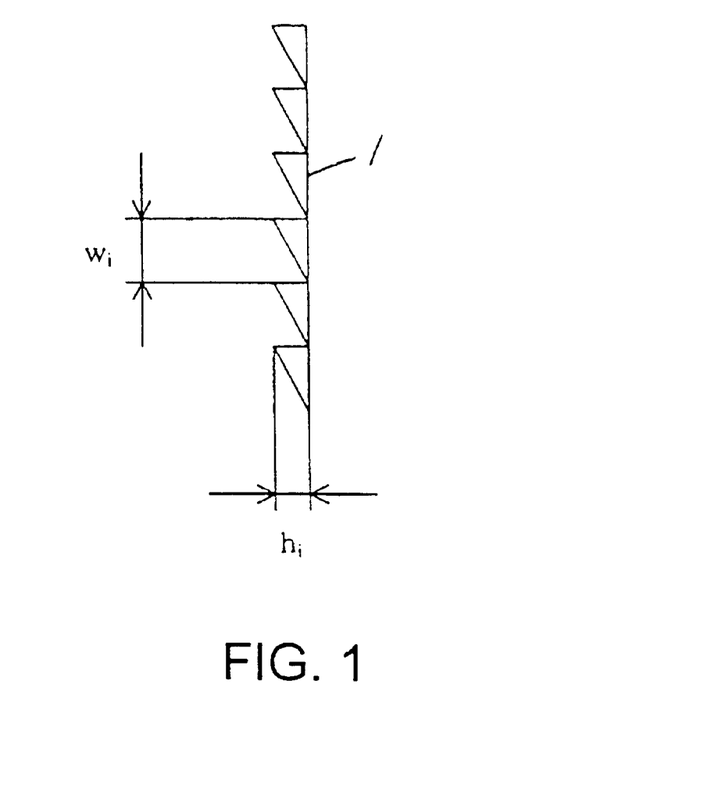
FIG. 1 is a schematic diagram of a transmissive blazed diffraction grating.
Figure 2:
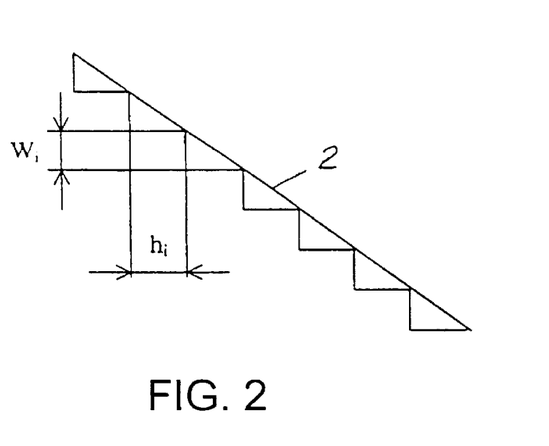
FIG. 2 is a schematic diagram of a transmissive echelon grating.

In order to meet system specifications and to achieve enhanced dispersion, optical systems employing the present invention are optimized using standard techniques commonly employed in the design of imaging systems. The element spacings, their dimensions, material properties, groove geometry, and the working order of diffraction can be used as variables in the optimization procedure to meet performance targets based on the device specification and manufacturability requirements. In particular, the shape of the grooves of the transmissive grating (i.e., the groove's blaze angle, width, and height) is selected to maximize the efficiency of the light diffracted in the working order and to minimize the light getting into diffraction orders other than the working order using standard techniques known in the art. Thus, the $h_i$ and $w_i$ values in FIG. 1 and FIG. 2 are selected on the basis of desired performance criteria and desired diffraction efficiency.

The systems of the invention can be used to either disperse composite light into its components (e.g., in a wavelength demultiplexer) or to combine light of different wavelengths into a composite (e.g., in a wavelength multiplexer).

When used to disperse light, the invention provides an optical system for dispersing composite electromagnetic radiation into dispersed electromagnetic radiation comprising:

(a) an input for the composite electromagnetic radiation and an output for the dispersed electromagnetic radiation;

(b) a transmissive diffractive grating;

(c) optics to provide conjugate imagery between the input and the output; and (d) a reflector to pass the radiation twice through the diffraction grating.

When used to combine light, the invention provides an optical system for combining dispersed electromagnetic radiation into composite electromagnetic radiation comprising:

(a) an input for the dispersed electromagnetic radiation and an output for the composite electromagnetic radiation;

(b) a transmissive diffractive grating;

(c) optics to provide conjugate imagery between the input and the output; and (d) a reflector to pass the radiation twice through the diffraction grating.

In accordance with certain embodiments of the invention, the dispersing/combining aspects of the invention are used together to produce an add-drop system. In accordance with these embodiments, the invention provides an add-drop device which comprises:

(a) an input for input signals at a plurality of wavelengths;

(b) an output for output signals;

(c) a transmissive diffractive grating;
(d) optics to provide conjugate imagery between the input and the output; and
(e) a reflector which: (i) reflects at least one selected wavelength of the plurality of wavelengths so that said wavelength passes through the diffractive grating twice; and (ii) transmits the remainder of the plurality of wavelengths so that those wavelengths do not pass through the diffractive grating twice.

In a preferred embodiment, the invention provides an add-drop system comprising:
(a) a system input for input signals at a plurality of wavelengths;
(b) add inputs for add signals at a plurality of add/drop wavelengths;
(c) a system output for output signals;
(d) drop outputs for drop signals at the plurality of add/drop wavelengths;
(e) a first transmissive diffractive grating;
(f) a second transmissive diffractive grating;
(g) a reflector which: (i) reflects the plurality of add/drop wavelengths; and (ii) transmits the remainder of the plurality of wavelengths other than the plurality of add/drop wavelengths; and
(h) optics which: (i) passes the drop signals from the system input through the first transmissive diffractive grating twice to disperse the plurality of add/drop wavelengths to the drop outputs; (ii) passes the add signals from the add inputs through the second transmissive grating twice so that the plurality of add/drop wavelengths from the add inputs have substantially no dispersion at the system output; and (iii) passes the remainder of the plurality of wavelengths from the system input through the first and second transmissive gratings so that those wavelengths have substantially no dispersion at the system output.

BRIEF DESCRIPTION OF THE DRAWINGS

The various advantages of the present invention will become apparent to one skilled in the art by reading the following specification and by reference to the following drawings in which.

DESCRIPTION OF THE PREFERRED EMBODIMENTS OF THE INVENTION

The invention is illustrated by the following embodiments. Although the embodiments are from the field of optical communications, the invention can equally be used in any other field where a dispersive system is utilized, e.g., in spectroscopy. Embodiments of the invention can employ transmissive blazed diffraction gratings, transmissive echelon gratings, and combinations thereof, as well as reflective diffractive gratings.

FIG. 1 shows schematically a transmissive blazed diffraction grating fabricated on substrate surface 1. FIG. 2 shows schematically a transmissive echelon grating fabricated on surface substrate 2. Both grating types can be characterized by a width $w_i$ and a depth $h_i$ of the grating's grooves. In the case of the echelon, the surface substrate is placed at an angle to the optical axis.

Figure 3:
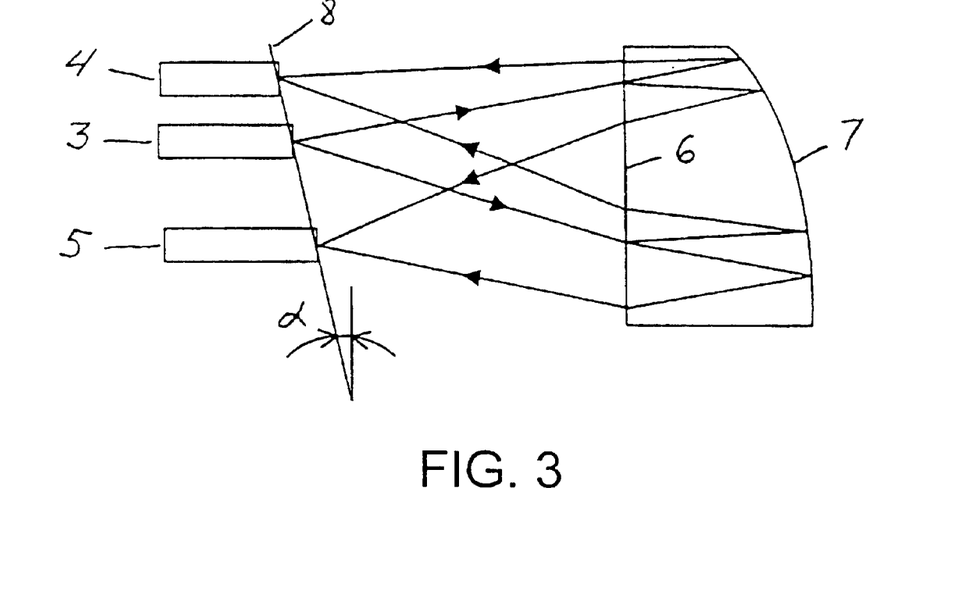
FIG. 3 is a schematic diagram of a first layout of a system employing a transmissive blazed diffraction grating through which light passes twice.

The first and second embodiments of the present invention are low cost solutions for multiplexing and/or demultiplexer individual wavelength bands. The system layout according to the first and second embodiments is shown schematically in FIG. 3, where the numeral 3 represents an input fiber, numerals 4 and 5 represent output fibers, 6 represents the substrate surface of a transmissive blazed diffractive grating, and 7 is a reflective surface. As shown in this figure, the transmissive blazed grating 6 and the mirror surface 7 are opposing surfaces of a single optical component. The vertex of mirror surface 7 is offset from the axis of input fiber 3. The number of output fibers is based on the system specifications. The output fibers are shown aligned in a plane 8 that is at an angle α to the transverse direction to the optical axis of the input fiber 3. The input fiber 3 can be in the same plane 8 as shown in FIG. 3, or can be offset from that plane.

The third embodiment is a higher cost, high dispersion device for multiplexing and/or demultiplexer individual channels in high capacity DWDM system. The system layout according to the third embodiment is shown schematically in FIG. 4 and FIG. 5, where the numeral 11 represents an input fiber, numerals 21 through 27 represent output fibers, 31 and 32 are the first and second surfaces of a collimator lens 30, 41 represents the substrate of a transmissive echelon, and 42 is the surface of a flat mirror. The input fiber 11, as well as the output fibers 21 through 27, are located in a plane that is at an angle to the transverse direction to the optical axis of fiber 11. As shown in the FIG. 5, the input fiber 11 is laterally offset from the output fiber array.

Figure 4:
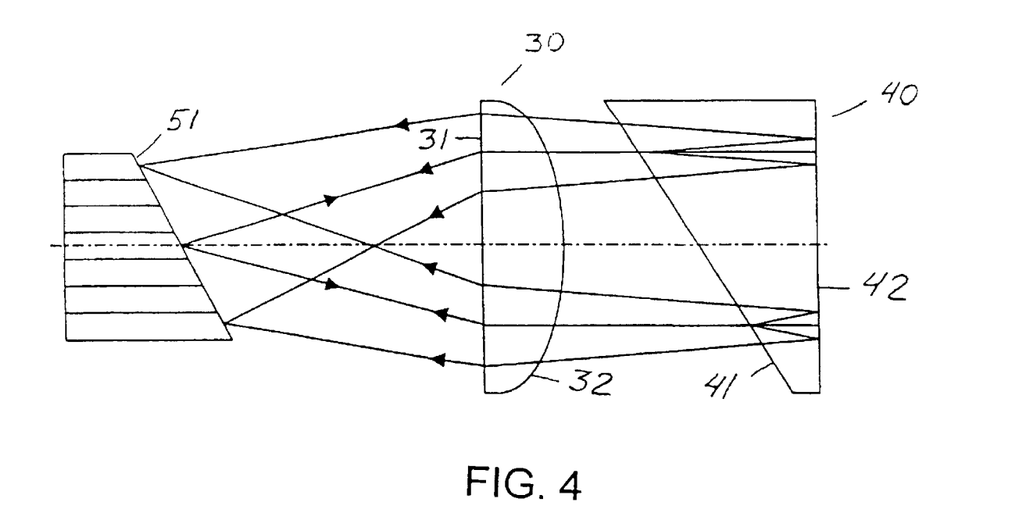
FIG. 4 is a schematic diagram of a second layout of a system employing a diffractive optical element through which light passes twice.

Although the echelon 41 and the mirror 42 are shown as a part of a single component 40 in FIG. 4, they can be used with the same success as independent components. Similarly, various other fiber packaging configurations are possible for the input and output fibers besides that shown in FIG. 5.

The components of the system of the third embodiment can be arranged to produce an add-drop type configuration for a multiplexing/demultiplexer device. An example of this aspect of the invention is set forth below in Embodiment 4.

Many other configurations with various dispersions and costs can be designed by those skilled in the art based on the present disclosure.

Embodiment 1

The simplest solution employs a single optical component that performs dispersing, focusing, and reflecting functions. Such a single component is shown in FIG. 3.

The system is designed to multiplex/demultiplex two wavelength channels, 0.85 μm and 1.30 μm, and can be used with both single-mode (SM) or multi-mode (MM) fibers. In the particular example depicted in FIG. 3. coupling into MM fibers with NA=0.25 is illustrated.

The diffractive element in this case is a blazed transmissive diffraction grating at has a line spacing of 10 μm and an aspheric mirror surface opposing the grating. The system length is 1.4 mm and the element diameter is 0.7 mm. The linear dispersion of the system is calculated to be 2.5 nm/μm.

Figure 6:
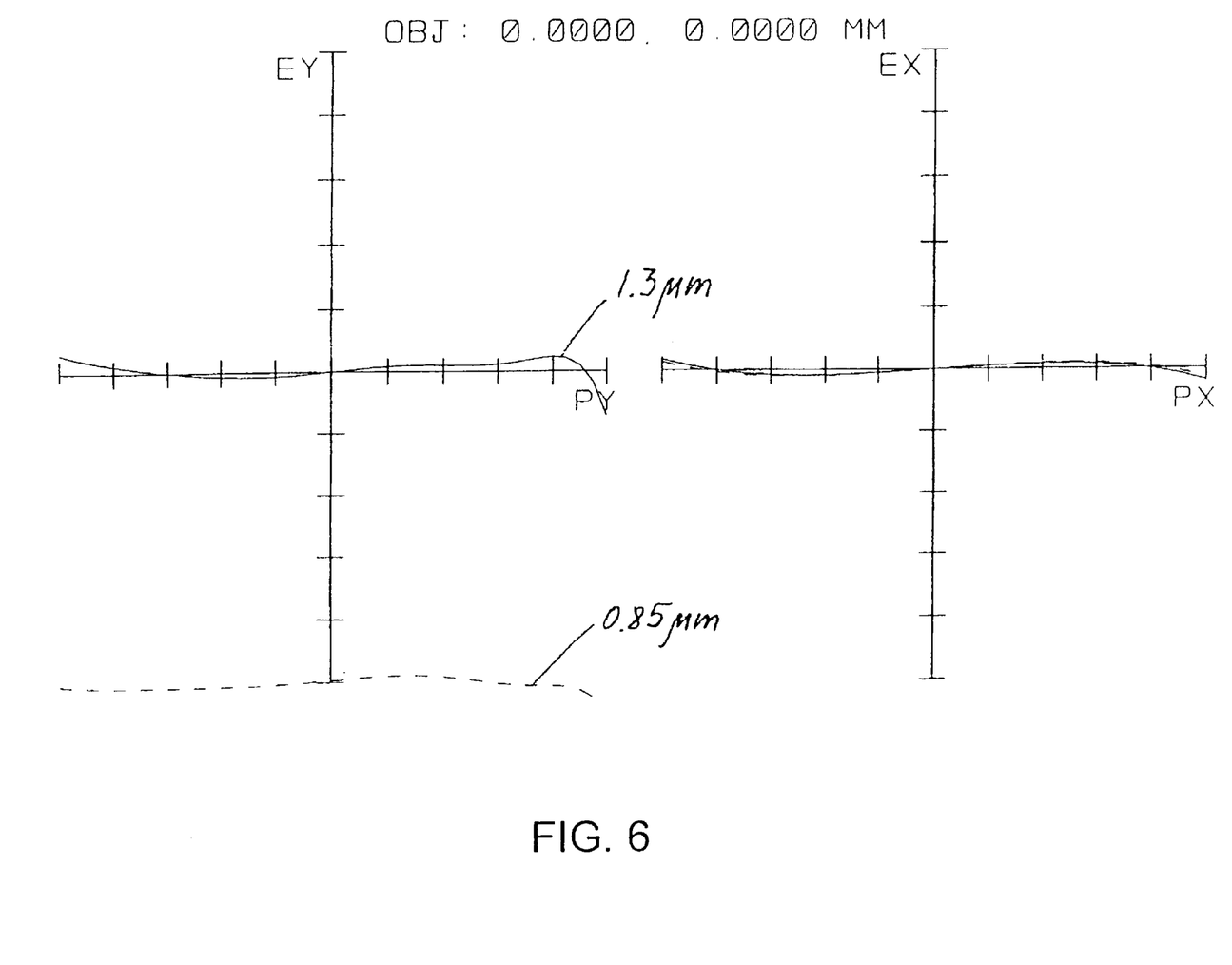
FIGS. 6, 7, and 8 present ray aberration curves for the first, second, and third embodiments set forth below. The maximum scales in these figures are ±185 microns in FIG. 6, ±325 microns in FIG. 7, and ±360 microns in FIG. 8.

The ray aberration curves for this embodiment are presented in FIG. 6. The geometrical spot sizes at 0.85 μm and 1.30 μm are 20.4 μm and 27.2 μm, respectively, assuring complete coupling (excluding reflection losses) into a MM fiber. The above element can be made by established techniques used in the fabrication of microoptics or can be molded from plastic.

Table 1A sets forth the design data for this embodiment where:

(1) Surfaces 2 and 4 represent the blazed transmissive diffraction grating 6 of FIG. 3. This grating works in the 1st diffraction order and has a line spacing of 100 lines/mm.

(2) Surface 3, which is mirror 7 of FIG. 3, is a polynomial asphere defined by the following equation:

$$Z = \frac{(1/R)(r)^2}{1 + \sqrt{1 - (1+K)(1/R)^2(r)^2}} + A(r)^2 + B(r)^4 + C(r)^6 + D(r)^8 + E(r)^{10} + F(r)^{12} + G(r)^{14} + H(r)^{16}$$

where Z defines the surface sag along the optical axis, R is the surface radius of curvature, and r is the radial coordinate.

(3) The coefficients of surface 3 are set forth in Table 1B.

(4) The vertex of surface 3 is offset from the optical axis in the tangential plane by 0.2437 mm.

(5) The image plane 5, which is plane 8 in FIG. 3, is rotated counterclockwise at an angle of 5.475 deg. in the tangential plane.

Embodiment 2

The second embodiment is also represented by FIG. 3. It is intended for use with SM (Single Mode) fibers that have NA=0.1 and employs a single diffractive optical component that performs dispersing, focusing, and reflecting functions.

The device is designed to multiplex/demultiplex three wavelength bands: 0.65 μm, 0.75 μm and 0.85 μm, respectively. The length of the system employing the device is 4.8 mm, the clear aperture (CA) is about 1.2 mm, and the linear dispersion of the system is 2.5 nm/μm. The diffractive element can be made by established techniques of microoptics fabrication or can be molded from plastic.

Figure 7:
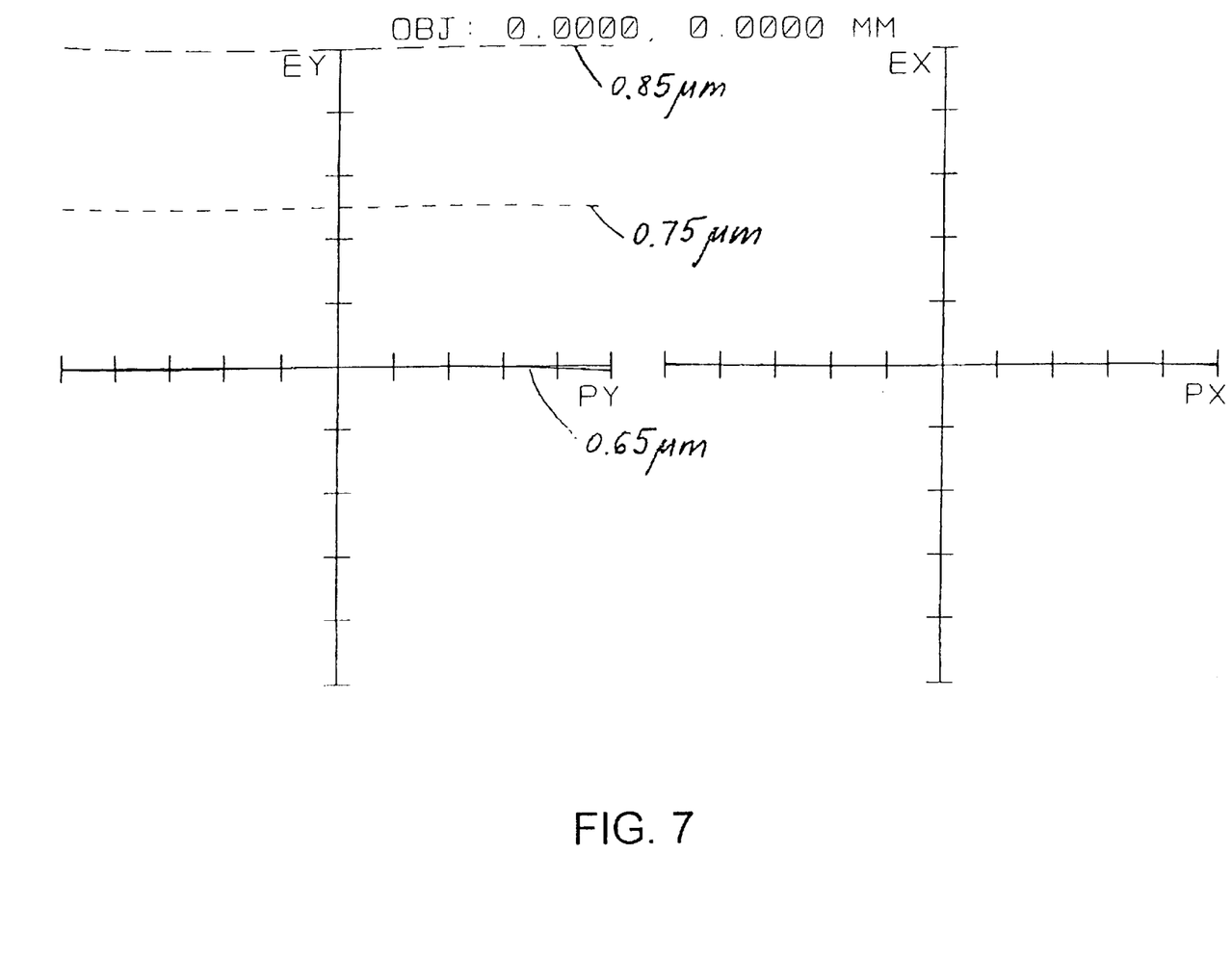

The ray aberration curves for the above wavelength bands are shown in FIG. 7. The coupling efficiency for 0.65 μm, 0.75 μm and 0.85 μm is calculated to be 2.8 dB, 2.5 dB and 2.6 dB, respectively.

Table 2 contains the design data for this embodiment where:

(1) Surfaces 2 and 4 represent the blazed transmissive diffraction grating 6 of FIG. 3. This grating works in the 1st diffraction order and has a line spacing of 100 lines/mm.

(2) Surface 3, which is mirror 7 of FIG. 3, is defined by the following equation:

$$Z = \frac{(1/R)(r)^2}{1 + \sqrt{1 - (1+K)(1/R)^2(r)^2}}$$

where the coefficient K=0.8284

(3) The vertex of surface 3 is offset from the optical axis in the tangential plane by 0.6248 mm.

(4) The image plane 5, which is plane 8 in FIG. 3, is rotated counterclockwise at an angle of 4.9115 deg. in the tangential plane.

Embodiment 3

Figure 5:
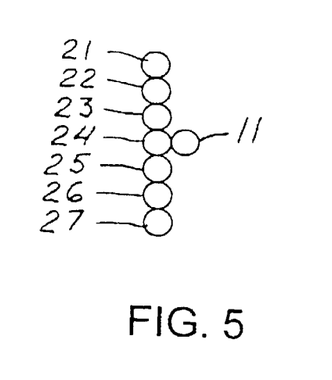
FIG. 5 is a schematic end view of an input and output fiber arrangement for use with the layout of FIG. 4.

The third embodiment is shown in FIG. 4 and FIG. 5. It is intended for use with SM (Single Mode) fibers and employs two optical components. One component is a collimator lens and the other component combines dispersive and reflective functions: one surface has a transmissive diffraction grating formed on it, and the other surface is a planar reflective mirror. Due to the mirror on the back surface of the diffractive element, this design is well suited to add/drop configurations in which different channels can be selectively reflected and/or transmitted by employing a selective reflector coating (see Embodiment 4 below). The device is designed to multiplex/demultiplex 35 wavelength channels located on the 100 GHz channel grid in the 1550 nm wavelength band (from 1559.8 nm to 1532.7 nm).

The length of the system is 80 mm, the clear aperture is 20 mm, and the linear dispersion of the system is 0.038 nm/μm. The SM fibers are spaced 0.022 mm apart, which is within the practical limit for fiber spacing. See J. P. Laude et al., "Diffraction gratings stretch fiber capacity," *Photonics Spectra*, No. 2, 1996, pp. 107–111. The diffractive grating is of transmissive echelon type and can be made by using standard lithographic equipment. The grating substrate is at an angle of 35 deg. with respect to the plane transverse to the axis of the input fiber.

Figure 8:
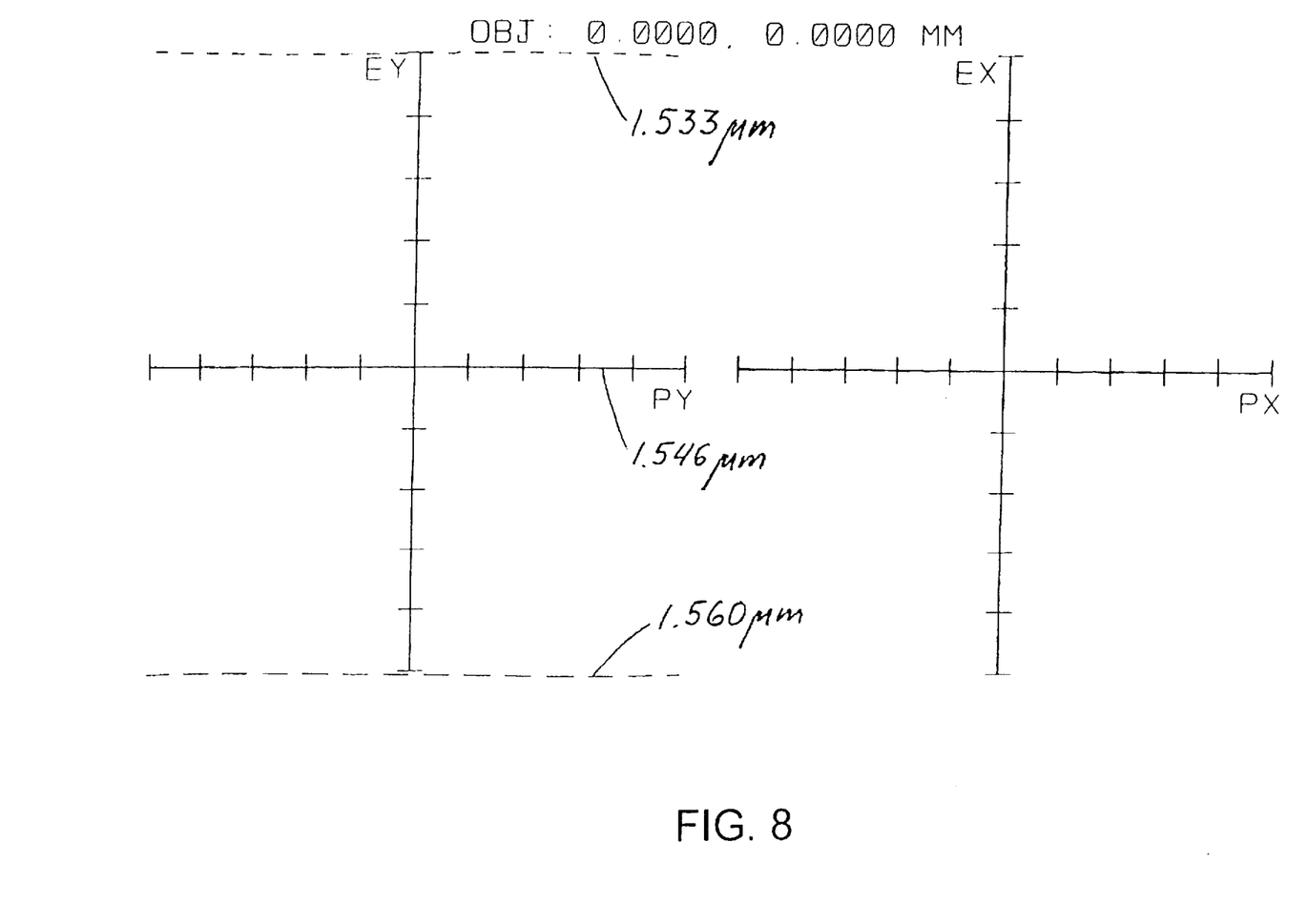

The ray aberration curves are shown in FIG. 8 and illustrate the excellent correction of aberrations achieved by the system. The coupling efficiency for wavelengths of 1.546μ, 1.533μ, and 1.560μ is calculated to be 0.07 dB, 0.14 dB and 0.21 dB, respectively.

Table 3A contains the design data for this embodiment where:

(1) Surfaces 2 and 8 represent a diffractive kinoform surface at surface 31 of FIG. 4. This kinoform surface is characterized by the following phase polynomial:

$$\Phi = A_2(r)^2 + A_4(r)^4 + A_6(r)^6 + A_8(r)^8$$

where Φ is the phase and r is the radial coordinate. The coefficients of the polynomial used for surfaces 2 and 8 are set forth in Table 3B.

(2) Surfaces 4 and 6 represent the transmissive diffraction grating of the echelon type at surface 41 in FIG. 4. This grating works in the 2nd diffraction order and has a line spacing of 82.308 lines/mm.

(3) The image plane 9, which is surface 51 in FIG. 4. is rotated counterclockwise at an angle of 23.79 deg. in the tangential plane.

Embodiment 4

The fourth embodiment is an add/drop configuration based on the multiplexing/demultiplexer device of Embodiment 3. The system layout according to the fourth embodiment is shown schematically in FIG. 9, where the numeral 111 represents an input fiber, numerals 121 and 122 represent two dropped channels, 131 and 132 are two added channels, 141 is a fiber representing the output of the add/drop device, 151 and 152 are the first and second surfaces of a first collimator lens 150, 161 represents the substrate of a first transmissive echelon, 162 is a surface of a flat mirror with selective transmission characteristics. 163 is a substrate of a second transmissive echelon, and 171 and 172 are the first and second surfaces of a second collimator lens 170.

Figure 9:
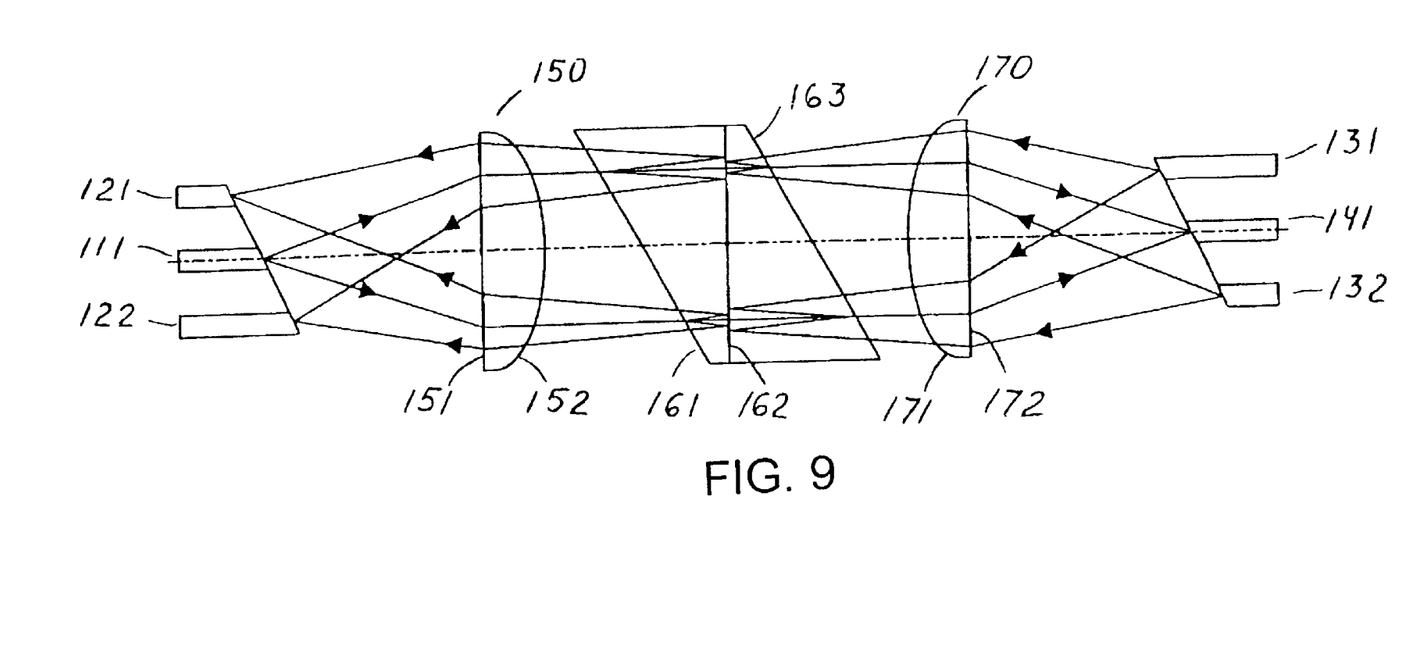
FIG. 9 is a schematic diagram of an add-drop device employing two transmissive diffractive gratings through each of which light passes twice.

The input fiber 111 and the fibers 121 and 122 for the dropped channels are located in a plane that is at an angle to the transverse direction to the optical axis of the input optical fiber 111. The output fiber 141 and the fibers 131 and 132 for the added channels are located in a plane that is at an angle to the transverse direction to the optical axis of the output optical fiber 141. The composite radiation from the input fiber 111 is passing through the first collimator 150, first echelon 161 and is incident on the mirror 162.

Mirror 162 has selective characteristics: it has high reflectivity for the dropped and added channels and high transmissivity at the other channels. The radiation reflected by the mirror 162 is passing back through the transmissive echelon 161, through the collimator 150 and is focused onto the fibers 121 and 122 for the dropped channels. The radiation transmitted by the mirror 162 passes through the second transmissive echelon 163, through the collimator 170 and is focused on the face of the output fiber 141 of the device. For the radiation transmitted by the mirror 162, echelon 163 cancels the dispersion introduced by echelon 161 so that all wavelengths for the channels which pass through mirror 162 have substantially zero dispersion at the entrance of fiber 141.

The radiation from the added channels enters the system through fibers 131 and 132, passes through collimator 170 and echelon 163, is reflected by the mirror 162, passes a second time through echelon 163 and collimator 170, and is thereby focused on the entrance surface of output fiber 141.

As shown in FIG. 9, the add-drop system employs a single selective mirror 162. Although a single mirror is preferred, two spaced apart mirrors can be used if desired. The prescription set forth above in connection with Embodiment 3 can be used for the collimator lenses and echelons of Embodiment 4. Various of fibers 111, 121, 122, 131, 141, and 132 can be offset as in FIG. 5 (e.g., fiber 111 can be offset from fibers 121 and 122 and fiber 141 can be offset from fibers 131 and 132) or all of the fibers can be aligned in a plane containing fibers 111 and 141.

The present invention is not limited to a single transmissive DG in a double pass configuration. Rather, several transmissive DGs can be used in a double pass configuration to even further increase the system dispersion. As an example, the diffractive component in the third embodiment may have both surfaces made as transmissive DGs with a reflective surface being located to the right of surface 42 in FIG. 4. Alternatively, a reflective diffractive surface can be formed at surface 42 of FIG. 4.

As will be evident to those skilled in the art, other changes may be made in the above-described embodiments without departing from the scope of the invention. Therefore, it is intended that all matter contained in the above description or shown in the accompanying drawings shall be interpreted as illustrative and not in a limiting sense.

TABLE 1A

| Surface Number | Radius, mm | Spacing, mm | Material |
| --- | --- | --- | --- |
| 1 (Object) | Infinity | 1.00 | Air |
| 2 (Grating) | Infinity | 0.40 | Silica |
| 3 (Mirror) | −1.8977 | −0.40 | Silica |
| 4 (Grating) | Infinity | −1.00 | Air |
| 5 (Image plane) | Infinity | | |

TABLE 1B

| Coefficient | Value |
| --- | --- |
| K | 1.6083 |
| A | 0.0000 |
| B | 0.0000 |
| C | −0.0491 |
| D | 0.6069 |
| E | −2.0390 |
| F | −0.4243 |
| G | 15.6153 |
| H | −22.3599 |

TABLE 2

| Surface Number | Radius, mm | Spacing, mm | Material |
| --- | --- | --- | --- |
| 1 (Object) | Infinity | 4.00 | Air |
| 2 (Grating) | Infinity | 0.80 | Silica |
| 3 (Mirror) | −6.6472 | −0.80 | Silica |
| 4 (Grating) | Infinity | −4.00 | Air |
| 5 (Image plane) | Infinity | | |

TABLE 3A

| Surface Number | Radius, mm | Spacing, mm | Material |
| --- | --- | --- | --- |
| 1 (Object) | Infinity | 56.00 | Air |
| 2 (Kinoform) | Infinity | 4.20 | Silica |
| 3 (Refractive Surf.) | −32.3718 | 7.00 | Air |
| 4 (Grating) | Infinity | 12.60 | Silica |
| 5 (Mirror) | Infinity | −12.60 | Silica |
| 6 (Grating) | Infinity | −7.00 | Air |
| 7 (Refractive Surf.) | −32.3718 | −4.20 | Silica |
| 8 (Kinoform) | Infinity | −56.00 | Air |
| 9 (Image plane) | Infinity | | |

TABLE 3B

| Coefficient | Value |
| --- | --- |
| $A_2$ | −5682.5969 |
| $A_4$ | 3645.8961 |
| $A_6$ | −170.4284 |
| $A_8$ | −88.3412 |

What is claimed is:

1. An add-drop device comprising:
   (a) an input for input signals at a plurality of wavelengths;
   (b) an output for output signals;
   (c) a transmissive diffractive grating;
   (d) optics to provide conjugate imagery between the input and the output; and
   (e) a reflector which: (i) reflects at least one selected wavelength of the plurality of wavelengths so that said wavelength passes through the diffractive grating twice; and (ii) transmits the remainder of the plurality of wavelengths so that those wavelengths do not pass through the diffractive grating twice.

2. An add-drop system comprising:

(a) a system input for input signals at a plurality of wavelengths;

(b) add inputs for add signals at a plurality of add/drop wavelengths;

(c) a system output for output signals;

(d) drop outputs for drop signals at the plurality of add/drop wavelengths;

(e) a first transmissive diffractive grating;

(f) a second transmissive diffractive grating;

(g) a reflector which: (i) reflects the plurality of add/drop wavelengths; and (ii) transmits the remainder of the plurality of wavelengths other than the plurality of add/drop wavelengths; and (h) optics which: (i) passes the drop signals from the system input through the first transmissive diffractive grating twice to disperse the plurality of add/drop wavelengths to the drop outputs; (ii) passes the add signals from the add inputs through the second transmissive grating twice so that the plurality of add/drop wavelengths from the add inputs have substantially no dispersion at the system output; and (iii) passes the remainder of the plurality of wavelengths from the system input through the first and second transmissive gratings so that those wavelengths have substantially no dispersion at the system output.

* * * * *